United States Patent
Tawil

(10) Patent No.: US 6,421,723 B1
(45) Date of Patent: Jul. 16, 2002

(54) METHOD AND SYSTEM FOR ESTABLISHING A STORAGE AREA NETWORK CONFIGURATION

(75) Inventor: Ahmad Hassan Tawil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/330,725

(22) Filed: Jun. 11, 1999

(51) Int. Cl.$^7$ .............................................. G06F 15/173
(52) U.S. Cl. ...................... 709/224; 709/223
(58) Field of Search ............................... 709/223, 224, 709/246, 295, 230

(56) References Cited

U.S. PATENT DOCUMENTS

| | | | | |
|---|---|---|---|---|
| 4,354,225 A | | 10/1982 | Frieder et al. ............... | 364/200 |
| 4,410,942 A | | 10/1983 | Milligan et al. ............ | 364/200 |
| 4,843,544 A | | 6/1989 | DuLac et al. ................ | 364/200 |
| 5,129,072 A | | 7/1992 | Larner et al. ................ | 395/325 |
| 5,204,951 A | | 4/1993 | Keener et al. ............... | 395/325 |
| 5,239,632 A | | 8/1993 | Larner ......................... | 395/325 |
| 5,426,736 A | * | 6/1995 | Guineau, III ................. | 710/3 |
| 5,455,933 A | | 10/1995 | Schieve et al. ......... | 395/183.03 |
| 5,495,584 A | | 2/1996 | Holman, Jr. et al. ........ | 395/308 |
| 5,548,783 A | | 8/1996 | Jones et al. ................. | 295/836 |
| 5,680,539 A | * | 10/1997 | Jones .......................... | 711/114 |
| 5,881,269 A | * | 3/1999 | Dobbelstein ................. | 703/21 |
| 6,233,702 B1 | * | 5/2001 | Horst et al. .................... | 714/11 |
| 6,311,296 B1 | * | 10/2001 | Congdon ..................... | 713/501 |
| 6,330,585 B1 | * | 12/2001 | Casper et al. ................ | 709/200 |

FOREIGN PATENT DOCUMENTS

JP  5128052  11/1991  ........... G06F/13/36

OTHER PUBLICATIONS

Bill Thomas et al., Hewlett–Packard Journal, "Two Software Architectures, One Offline and the other Online, ar euse to Provide EISA SCSI Support for the HP 900 Series 700 Workstations", pp97–105, Dec. 1992.

U.S. Patent application Ser. No. 08/081,736 (now abandoned) entitled "Data Storage Controller with Reduced Host Interrupt Requests" filed by Alan Davis, Jun. 24, 1993.

Storage Area Network (SAN) Technology, Aug. 1998, <http://www.dell.com/r&d/whitepapers/wpsan.html.

Storage Area Network (SAN) Solutions, Feb. 1999, <http://www.dell.com/r&d/wp/spring99/sansol.html.

* cited by examiner

Primary Examiner—Mehmet B. Geckil
(74) Attorney, Agent, or Firm—Baker Botts L.L.P.

(57) ABSTRACT

A method and system establishes a storage area network configuration by automatically determining the number of initiators associated with the storage area network. An ID engine associated with an initiator of the storage area network determines the number of initiators associated with the storage area network by detecting signals, such as port login commands, received from the initiators. The determination of the number of initiators allow an initiator to adjust its queue depth for one or more targets associated with the storage area network so that the target command queue is less likely to reach capacity, resulting in task full message overhead for the storage area network. In one embodiment, each initiator comprises an ID engine and a queue depth engine to provide each initiator with an adjusted queue depth for one or more predetermined targets. The total value of the adjusted queue depths of the initiators may be equal to or less than the command queue value of the predetermined target to reduce the likelihood of task full status for the target. Adjusted queue depths may be set on a target-by-target basis to compensate for varying initiator bandwidth demands.

22 Claims, 1 Drawing Sheet

METHOD AND SYSTEM FOR ESTABLISHING A STORAGE AREA NETWORK CONFIGURATION

TECHNICAL FIELD

This invention relates in general to the field of computer networks, and more particularly to a method and system for establishing a storage area network configuration.

BACKGROUND

Demand for data storage capacity has substantially increased as data intensive applications have grown more common. For instance, interactive database applications, such as internet applications that allow remote access to data, have substantial data storage demands and operate most effectively if data is readily accessible. In addition to having a greater need for data storage capacity, these applications provide improved user utility with rapid data access and with the ability to share pooled data among a large number of users over distributed locations. To meet demands for increased storage capacity and more rapid access to data, the computer industry has developed storage area networks ("SAN"), a collection of data storage devices interfaced with one or more servers or workstations. Storage area networks offer scalable technology based on small computer system interface ("SCSI") and fibre channel protocol (FCP) compliant systems, frequently interconnected with hubs or switches.

Storage area networks offer centralized storage of data for increased efficiency and data handling. A properly implemented storage area network provides data access reliability and availability, unobtrusive capacity expansion such as with the addition of data storage devices, improved data backup and recovery, and performance that is competitive with local data storage. Many of the advantages of storage area networks are described in greater detail in an August 1998 Dell computer whitepaper entitled "Storage Area Network Technology" published at www.dell.com/r&d/whitepapers/wpsan.html and a February 1999 Dell computer whitepaper entitled "Storage Area Network Solutions" published at www.dell.com/r&d/wp/spring99/sansol.html.

Although, storage area networks offer many advantages for the efficient and timely distribution of data across a distributed network, some difficulties exist in the implementation of a storage area network, particularly as the number of devices interfaced with the storage area network increases. For instance, in a fibre channel storage area network environment with multiple initiators sending fibre channel protocol (FCP-SCSI) commands, the overhead related to these FCP-SCSI commands tends to use excessive bandwidth of the storage area network, potentially leading to a slowdown or even disruption of data transfers through the network.

Each target associated with a storage area network generally has a queue allotted to accept commands from initiators associated with the storage area network. The initiators seek to store data in or retrieve data from the target by sending commands to the target through the network. When a target queue is full the target responds to initiator FCP-SCSI commands, known as FCP_CMND commands, with a queue full response of TASK_FULL status in the FCP_RSP to indicate the queue is full and unable to accept or process the command from the initiator. When an initiator receives a queue full indication from a target device, the initiator generally retries sending the command to the target device at a subsequent time. Each initiator command and queue full response absorbs bandwidth of the storage area network, resulting in slowdowns of data transfer across the network. Further, in addition to creating unnecessary overhead activities on the network, the initiator attempts and queue full response increase CPU utilization in the targets and the initiators. Particularly during heavy network and CPU usage, initiators and targets sometimes fail to communicate properly resulting in timeouts with the dropping of frames or packets of data. In short, the initiators and targets become too busy to communicate with each other and to busy to communicate that they are too busy.

SUMMARY

Therefore, a need has arisen for a method and system which establishes a storage area network configuration to reduce overhead transactions on the storage area network, including overhead associated with target queue full states.

A further need exists for a method and system which establishes a storage area network configuration to reduce CPU utilization associated with overhead commands of the storage area network.

In accordance with the present invention, a method and system is provided that substantially eliminates or reduces disadvantages and problems associated with previously developed storage area networks. The method and system monitors signals of the storage area network to determine the number of initiators associated with the storage area network. Based upon the determination of the number of initiators, the method and system may automatically adjust the queue depth of at least one initiator associated with the storage area network.

More specifically, during initialization of the storage area network, an ID engine associated with an initiator interfaced with the storage area network monitors the signals communicated with over the storage area network to identify and count the port login commands provided by other initiators interfaced with the storage area network. During initialization, initiators provide port login commands to each target to identify the targets. Each initiator has a unique worldwide name included in the port login command. By tracking the unique names received during initialization of the storage area network, the initiator ID engine determines the number of other initiators associated with the storage area network. The initiator ID engine determines the total number of initiators by counting the unique login names and adding one to represent itself.

Once an initiator determines the number of initiators that are associated with the storage area network, the initiator automatically adjusts its queue depth from an initial queue depth to an adjusted queue depth having a value dependant upon the number of initiators associated with the storage area network. The adjusted queue depth limits the number of commands that the initiator can send to a predetermined target based upon the number of commands that the target is able to accept.

In one embodiment, an initiator's queue depth for a target may be set at a value equal to the total number of commands the target can accept divided by the total number of initiators associated with the target. Thus, if each initiator interfaced with the storage area network has an ID engine and configures an adjusted queue depth in proportion to the total number of initiators divided by the target's ability to accept commands, the target should avoid a task full status.

In an alternative embodiment, an initiator's queue depth for a target may be set at a value greater than or less than the queue depth of other initiators to compensate for initiator bandwidth to that target. Thus, each initiator may have an adjusted queue depth for each target associated with a storage area network so that the adjusted queue depth is established on a target-by-target basis.

The method and system for determining the number of initiators and adjusting initiator queue depth provides a number of important technical advantages. One important technical advantage is the automatic determination of the number of initiators interfaced with a network without operator intervention. The automatic determination tracks changes to network configuration, such as the addition or deletion of initiators from the network, each time the network is initialized. This accurate and reliable determination of the number of initiators supports optimal configuration of the network through reconfiguration of network devices.

Another important technical advantage is the automatic adjustment of queue depth of one or more initiators to an adjusted queue depth having a value dependent upon the number of initiators. The adjusted queue depth reduces network and CPU utilization by overhead commands associated with storage and retrieval of data. For instance, when the adjusted queue depth of one or more initiators for providing commands to a predetermined target is less than the number of commands that the target can handle, network and CPU utilization are reduced since initiator commands to the target will generally not result in a queue full status response from the target. Rather, initiators will wait to send commands to a target until the adjusted queue depth of the initiator indicates an ability by the target to handle the command.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
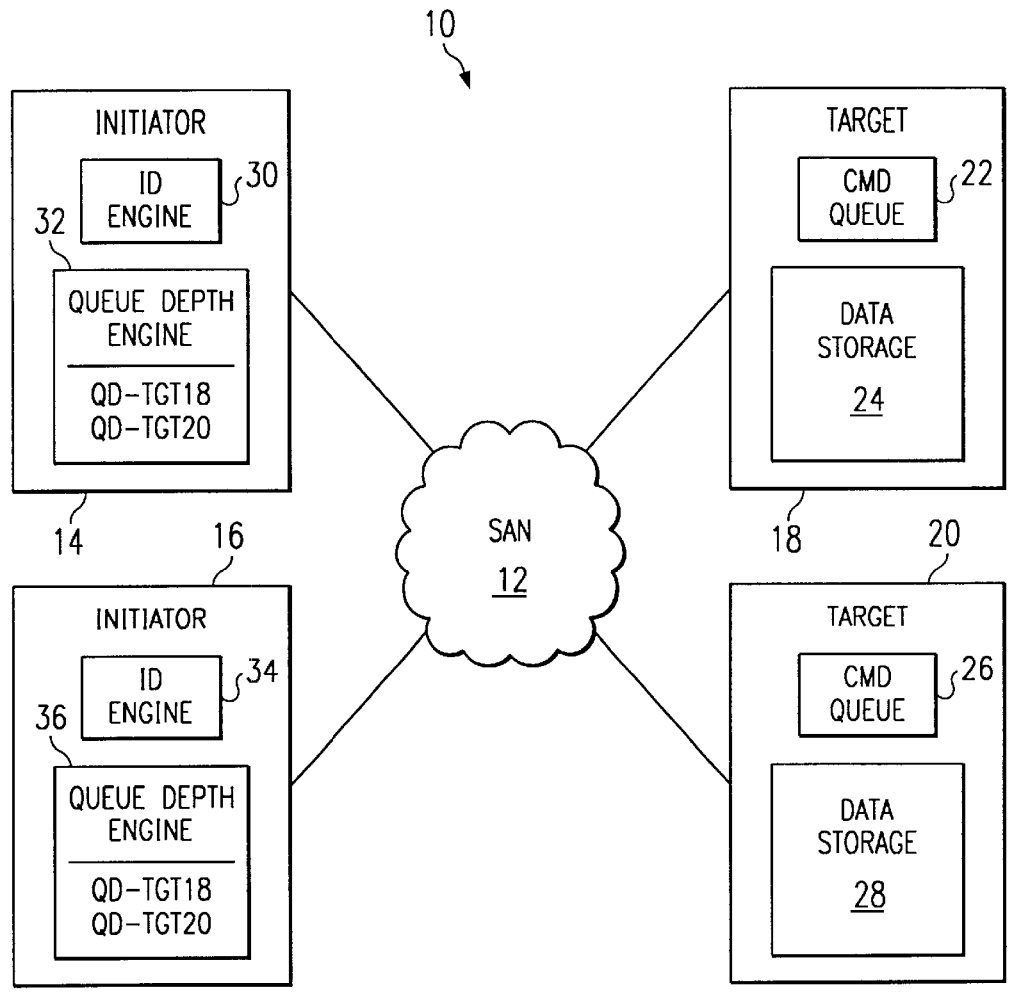
FIG. 1 depicts a block diagram of a storage area network.
Figure 2:
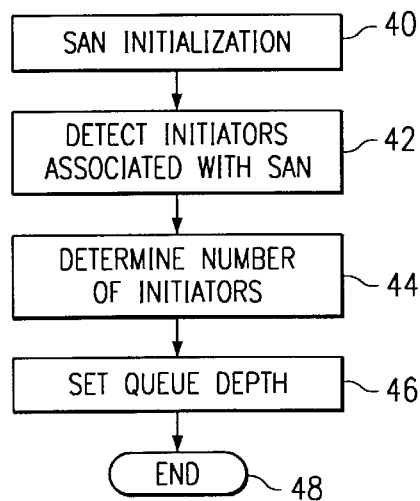
FIG. 2 depicts a flow diagram for establishing a storage area network configuration.

Preferred embodiments and their advantages are best understood by reference to FIGS. 1 and 2, wherein like numbers are used to indicate like and corresponding parts of the invention.

Storage area networks vary in size and complexity, and are flexible in their configurations for meeting the storage needs of a network site. A simplified storage area network configuration is depicted in FIG. 1 to illustrate the transfer of data between a limited number of devices interfaced with a storage area network. More complex storage area networks may have any number of devices interfaced with it as needed to meet a given user's storage needs.

Referring now to FIG. 1, a computer system 10 for storage of data is depicted. A storage area network 12 interfaces with plural initiators 14 and 16 and plural targets 18 and 20. Storage area network 12 may comprise conventional networking components compatible with fibre channel protocol and small computer system interface standards. Typical storage area network components are fibre channel based and may include host bus adapters, switches, bridges, disk arrays such as redundant arrays of independent disks (RAIDs) and other conventional components.

Essentially, a storage area network is defined when physical storage device sharing is enabled such as through fibre channel loops and hubs or switches. Each device interfaced with a fibre channel network is called a node. Nodes that generate and seek to store data, such as work stations or servers, are typically known as initiators or originators. Nodes that act as data storage devices, such as disk storage or RAID devices, are typically known as targets or responders. A storage area network may use different types of topologies, including point-to-point, switch to fabric, arbitrated loop and combinations of these three topologies.

Fibre channel technology allows data and network protocols to coexist on the same physical media. A typical command set protocol is FCP-SCSI compatible for interfacing initiators, such as servers and work stations, with targets, such as conventional storage devices and RAIDs. FCP-SCSI commands allow storage and retrieval of data to and from the initiator and the target storage device as though the storage area network is simply an SCSI device interfaced through fibre channel fabric.

Each of targets 18 and 20 include a command queue 22 and 26 and a data storage area 24 and 28. Command queues 22 and 26 accept commands known as FCP CMND from initiators associated with storage area network 12, and execute the commands for storing, recalling or otherwise manipulating data in data storage areas 24 and 28. Typically, command queues 22 and 26 may accept only a limited number of instructions for processing at a given time, such as up to 256 total commands or instructions at a time. If a command queue has accepted its maximum number of instructions, the command queue will refuse additional instructions by providing a task full status to the device sending the excessive instructions. Target devices having full command queues typically send task full status responses until the command queue has room to accept additional instructions, and may time out excessive instructions or task full responses resulting in lost data frames or packets. Devices attempting to send instructions to the command queues typically reattempt the instructions periodically, often exacerbating the task full status by consuming target and initiator CPU utilization and slowing the target's ability to clear the instructions from the command queues.

Initiators 14 and 16 initiate data transactions through storage area network 12 to targets 18 and 20. Initiators 14 and 16 include ID engines 30 and 34 for monitoring signals communicated over storage area network 12. Queue depth engine 32 associated with initiator 14 stores a queue depth representing the number of commands that initiator 14 may send to targets 18 and 20 respectively. Queue depth engine 36 associated with initiator 16 stores a queue depth representing the number of commands that initiator 16 may send to targets 18 and 20 respectively.

The initial queue depth of a queue depth engine for a predetermined target is typically equal to the total number of instructions that the target's command queue is capable of accepting. Thus, for instance, an initial queue depth of 256 for initiator 14 with respect to target 18 will ensure that the command queue 22 will not become full if initiator 14 is the only initiator that sends instructions to target 18. However, if initiator 16 also sends instructions to target 18, then some risk exists that the combined commands from initiators 14 and 16 to target 18 may result in a queue full status of command queue 22. To reduce the risk of a queue full status, the queue depth of the initiators with respect to a predetermined target may be reduced from the initial queue depth to an adjusted queue depth that depends upon the total number of initiators sending instructions to the target.

The primary difficulty of establishing an adjusted queue depth is determining the number of initiators that are interfaced with a predetermined target. An important advantage of storage area networks is their flexibility in configuration to meet storage needs by interfacing additional targets and initiators with the storage area network as data storage demands increase, or reducing the number of targets and initiators as data storage needs decrease. Thus, effective use of a storage area network may result in a dynamic environment in which the number of initiators or targets frequently changes.

In order to obtain an accurate determination of the number of initiators interfaced with a storage area network, ID engines 30 and 34 monitor signals sent by initiators over the storage area network by other initiators. For instance, when a new node, such as an initiator or target, is added to storage area network 12, an initialization process is accomplished. During initialization of storage area network 12, each initiator performs a target discovery process in which each initiator sends a signal, such as a port login command (PLOGI), to each node interfaced with the storage area network. The port login command includes a payload containing a unique world wide name and a port name for the initiator that allows a determination of the total number of initiators through a count of the number of unique names detected across the storage area network.

As an example, during the target discovery process of storage area network 12, initiator 14 sends a port login command to targets 18 and 20 and to initiator 16. Initiator 16 determines the total number of interfaced initiators by counting the number of unique port login commands received by ID engine 34 and then adding one to represent itself. Similarly, ID engine 30 associated with initiator 14 receives the port login command from initiator 16 to perform its own determination of the number of initiators interfaced with storage area network 12. Thus, at the conclusion of the target discovery process, ID engines 30 and 34 will each have determined that a total of two initiators are interfaced with storage area network 12. If additional initiators are interfaced with storage area network 12, the determination of the number of initiators may be accomplished through the identification of each additional unique world wide name associated with each login command.

Once ID engines 30 and 34 have determined the total number of initiators interfaced with storage area network 12, queue depth engines 32 and 36 may then establish an adjusted queue depth for each initiator on a target-by-target basis. The most simple way to establish an adjusted queue depth is to divide the initial queue depth value for each target by the total number of initiators determined to be interfaced with the storage area network. For instance, queue depth engines 32 and 36 may have an initial queue depth of 256 for target 18, with the queue depth of 256 corresponding to the number of instructions that command queue 22 is capable of processing at a given time. Queue depth engines 32 and 36 will each set an adjusted queue depth for target 18 of 128 representing the initial queue depth of 256 divided by the two initiator determination of ID engine 30 and 34 respectively. In this manner, the total number of instructions provided by initiators 14 and 16 to target 18 will not exceed the 256 capacity of command queue 22, thus avoiding task full status for target 18.

In an alternative embodiment, the adjusted queue depths for one or more initiators may be set at different and unequal values to compensate for initiator bandwidth. For instance, one or more initiators may have a greater demand for data interactions with one or more targets. In such a situation, the queue depth engine of the initiator with the greater bandwidth demand for a predetermined target may set a value for the adjusted queue depth that is greater than the values set for one or more other initiators. Similarly, the queue depth engine of an initiator with a lesser demand for data interactions with one or more targets may set an adjusted queue depth that is less than the values set for one or more initiators. Although the queue depths of the initiators for a predetermined target may vary from initiator to initiator, the total queue depth of the initiators for the predetermined target may still be set at a value equal to the command queue of the predetermined target.

As an example, with respect to target 18, initiators 14 and 16 may each have an adjusted queue depth of 128. However, initiator 14 may have a greater need for bandwidth with respect to target 20 than does initiator 16. Thus, queue depth engine 32 may set a queue depth of 192 for initiator 14 with respect to target 20, and queue depth engine 36 may set a queue depth 64 for initiator 16 with respect to target 20. These unequal adjusted queue depth values bias upward the number of possible commands that initiator 14 can send to target 20 at the expense of the number of commands that initiator 16 can send to target 20, thus allowing compensation for the greater bandwidth demands of initiator 14.

Compensation of varying bandwidth demands is accomplished in a number of ways. For instance, an initiator with a greater bandwidth demand may include an algorithm in its queue depth engine that increases its queue depth by a predetermined factor, or maintains a minimum adjusted queue depth value. Alternatively, an initiator with a greater bandwidth demand may have a greater initial queue depth setting than other initiators, resulting in a greater adjusted queue depth being computed by its queue depth engine. Yet another alternative is for the initiator with the greater bandwidth demand to send a signal across the storage area network to other initiators, such as an extra port login command and unique world wide name, so that the other initiators set lower adjusted queue depth values.

Although setting adjusted queue depths of all initiators to a total value of equal to or less than the command queue value of the associated target will help to ensure that the command queue will not exceed its capacity, it should be noted that the total value of the queue depths of the initiators may exceed the capacity of the command queue. In such a case, the target's command queue may exceed its capacity. However, the target is unlikely to receive the total value of commands at a given point in time.

Referring now to FIG. 2, a flow diagram depicts the steps of establishing a storage area network configuration. At step 40, the storage area network begins initialization. Initialization occurs at any time that a target or initiator is added to or removed from the storage area network. Initialization may also occur based on a user input or by simulation of the addition or removal of nodes for the purpose of establishing the configuration of the storage area network.

At step 42, initiators interfaced with the storage area network are detected during the target discovery process. At step 44, the number of initiators is determined by one or more initiators by counting the number of unique port login commands received by the initiator and adding one representative of the initiator doing the counting. At step 46, the determination of the number of initiators is used to set an adjusted queue depth for at least one initiator. Finally, at step 48, the storage area network is operational with a configuration established that will reduce overhead commands and CPU utilization of both the target CPU's and the initiator CPU's through a reduced need for managing task full status of targets associated with the storage area network.

All of the present invention has been described in detail and it should be understood that various changes, substitutions and alternations can be made hereto without the parting from the spirit and scope of the invention as defined by the appended claims.

What is claimed is:

1. A method for determining the number of initiators interfaced with a storage area network, the method comprising:

initializing the storage area network;
   monitoring the signals generated by the initiators during the initializing of the storage area network; and
   using the monitored signals to determine the number of initiators associated with the storage area network.

2. The method of claim 1 wherein said initializing step further comprises sending a port login command from each initiator of the storage area network to each node of the storage area network to locate nodes associated with the storage area network.

3. The method of claim 2 wherein said monitoring step further comprises:

receiving the port login commands with at least one initiator; and
   determining the number of initiators by counting the number of unique initiator identifiers.

4. The method of claim 3 wherein the storage area network comprises a fibber channel storage network, and wherein each login command comprises a unique worldwide name for identifying the initiator associated with the login command.

5. The method of claim 1 further comprising adjusting the queue depth of at least one initiator for a target associated with the storage area network based upon the number of initiators determined by said using the monitored signals step.

6. The method of claim 5 wherein said adjusting step comprises determining the adjusted queue depth of the at least one initiator by dividing an initial queue depth by the number of initiators.

7. The method of claim 5 further comprising:

changing the number of initiators associated with the storage area network;
   repeating the initializing, monitoring, using, and adjusting steps.

8. The method of claim 21 wherein said changing the number of initiators step comprises adding at least one initiator to the storage area network.

9. The method of claim 5 wherein said adjusting step comprises determining the adjusted queue depth of each initiator as an initial queue depth divided by the number of initiators.

10. The method of claim 5 wherein the queue depth of plural initiators is adjusted so that at least one adjusted queue depth of one initiator is unequal to an adjusted queue depth of a second initiator.

11. A method for establishing a storage area network configuration, the method comprising:

determining the number of initiators associated with the storage area network; and
   automatically adjusting the queue depth of at least one initiator for at least one target from an initial queue depth to an adjusted queue depth, the adjusted queue depth having a value dependent upon the number of initiators.

12. The method of claim 11 wherein said determining step comprises:

initializing the storage area network;
   counting the port login commands received by an initiator during said initializing step; and
   determining the number of initiators as the number of unique login commands received plus one.

13. The method of claim 11 wherein said automatically adjusting step comprises determining the adjusted queue depth by dividing the initial queue depth by the number of initiators.

14. The method of claim 13 wherein the adjusted queue depth is equal for each initiator for the target associated with the storage area network.

15. The method of claim 11 wherein said automatically adjusting step further comprises biasing the adjusted queue depth to compensate for initiator bandwidth.

16. The method of claim 11 wherein said automatically adjusting step further comprises determining an adjusted queue depth for an initiator on a target-by-target basis.

17. The method of claim 16 wherein each initiator has a substantially equal adjusted queue depth for each target associated with the storage area network.

18. The method of claim 16 wherein at least one initiator has an adjusted queue depth for a target that is substantially greater than the adjusted queue depth of a second initiator for the target.

19. A computer system for storing data comprising:

a network for communicating data;
   at least one target interfaced with the network, the target accepting data for storage;
   plural initiators interfaced with the network; and
   at least one ID engine associated with at least on initiator, the ID engine for determining the number of initiators interfaced with the network.

20. The computer system of claim 19 further comprising a queue depth engine associated with at least one initiator, the queue depth engine for adjusting the queue depth of at least one initiator for the target according to a determination of the number of initiators provided by the ID engine.

21. The computer system of claim 20 wherein each of the plural initiators comprises an ID engine and a queue depth engine.

22. The computer system of claim 21 wherein the ID engine is operational to determine the number of initiators by counting the number of port logins received by an associated initiator during initialization of the storage area network.

* * * * *